United States Patent [19]

Ehlers et al.

[11] 3,764,655

[45] Oct. 9, 1973

[54] PROCESS FOR PURIFYING PHOSPHORIC ACIDS BY NEUTRALIZATION WITH AN ALKALI METAL HYDROXIDE AND/OR CARBONATE

[75] Inventors: Klaus-Peter Ehlers, Knapsack; Heinz Harnisch, Lovenich, both of Germany

[73] Assignee: Knapsack Aktiengesellschaft, Knapsack, Germany

[22] Filed: July 16, 1971

[21] Appl. No.: 163,505

[30] Foreign Application Priority Data

July 17, 1970 Germany.................. P 20 35 505.9

[52] U.S. Cl.............................. 423/309, 423/321
[51] Int. Cl.. C01b 25/16, C01b 15/16, C01b 25/26
[58] Field of Search...................... 23/106 A, 106 R, 23/107, 165; 423/307–309, 311–313

[56] References Cited
UNITED STATES PATENTS

| | | | |
|---|---|---|---|
| 598,182 | 2/1898 | Poole.................................... | 23/107 |
| 3,637,346 | 1/1972 | Ehlers et al........................... | 23/107 |

FOREIGN PATENTS OR APPLICATIONS

| | | | |
|---|---|---|---|
| 1,058,033 | 5/1959 | Germany............................ | 23/107 |
| 54,677 | 3/1967 | Germany............................ | 23/107 |

*Primary Examiner*—Oscar R. Vertiz
*Assistant Examiner*—Gregory A. Heller
*Attorney*—Arthur G. Connolly et al.

[57] ABSTRACT

Phosphoric acids produced by subjecting phosphate ores to wet-processing with mineral acids are purified by neutralizing them in a four step process by means of an alkali metal hydroxide and/or carbonate. In the first step, the crude phosphoric acids and the alkali metal hydroxide and/or carbonate are mixed together so as to produce a mixture with a pH-value of between 4 and 9, and resulting primary sludge consisting substantially of insoluble aluminum and iron phosphates is isolated from the purified phosphate solution. In the second step the sludge is mixed with a mixture consisting of alkali liquor (i.e. alkali metal hydroxide solution) and a trialkali phosphate solution and with a mixture consisting of water glass and a trialkali phosphate solution so as to produce a mash containing $SiO_2$ and $Al_2O_3$ in a molar ratio of larger than 2:1, and dissolved alkali metal oxide and dissolved $P_2O_5$ in a molar ratio of between 2.9:1 and 3.3:1. In the third step the second step mash is heated to temperatures of between 80° and 100° C and sludge appearing in the mash is disintegrated. This results in the formation firstly of a solution and secondly of a solid residue which is isolated and discarded. In the fourth step, the third step solution containing between 0.1 and 1.0 weight percent fluorine, is cooled to effect crystallization of a trialkali phosphate/alkali fluoride double salt, which is isolated from its mother liquor, and successively used for purifying a portion of the crude phosphoric acid with the resultant formation firstly of a secondary neutralization sludge, which is discarded, and secondly of a purified alkali phosphate solution, which is combined with alkali phosphate solution purified in the first step.

9 Claims, No Drawings

PROCESS FOR PURIFYING PHOSPHORIC ACIDS BY NEUTRALIZATION WITH AN ALKALI METAL HYDROXIDE AND/OR CARBONATE

The present invention relates to a process for purifying phosphoric acids, based on phosphate ores processed with mineral acids and commonly known as wet-processed phosphoric acids, which process comprises neutralizing the phosphoric acids by means of an alkali metal hydroxide and/or carbonate.

The purification of wet-processed phosphoric acid by neutralization of a pH of between 4 and 9 entails the formation of a sludge, which contains a major amount of iron and aluminum phosphates and a minor amount of calcium and magnesium phosphates, and which is isolated, for example, by filtration, from the solution to undergo finishing treatment.

Between 10 and 20 weight percent of $P_2O_5$, based on the $P_2O_5$-quantity in the crude phosphoric acid, is lost and the economy of the process greatly impaired, if such sludge is discarded. Attempts have therefore been made earlier to use the sludge for the production of alkali metal phosphates.

It is commonly known that alkaline sodium phosphate solutions are obtained on subjecting aluminum and iron phosphates of various origin to processing treatment with the use of a dilute sodium hydroxide solution, and that sodium orthophosphates crystallize out from these solutions in more or less good yields, conditional upon the alkali metal content in, and concentration of, the mother liquor. At the same time, sodium aluminate is produced, which is treated with sodium silicofluoride and transformed into sodiumaluminum fluoride, and an insoluble residue containing this latter compound together with iron hydroxide is obtained. To try reactive silicic acid or sodium fluoride is of no use, in this process.

These undissolved constituents are very difficult to isolate from the phosphate solutions. As a result of their high alkalinity, the resulting suspensions have extremely poor filtration properties. To remedy this, various thickeners are sometimes used in industry. These, however, must be used in extremely dilute form because of the sedimentation velocity required to be employed in such process, and this naturally has adverse effects upon the recovery of the trisodium phosphate from the filtrate. Successively concentrating the solution would entail considerable expenditure of capital and energy whereby the economy of the process would be considerably affected.

A further process of clarifying the above phosphate solutions, which comprises crystallizing the dissolved phosphate, filtering off undissolved constituents together with crystallized salt and successively displacing the salt by washing it, is not adapted for use under practical conditions because of technical difficulties. In addition thereto, in order to obtain commercial yields of $P_2O_5$, it would be necessary in this process to use water in quantities as large as those needed for the thickening operation described hereinabove. In other words, this process fails to provide a true solution for the problem.

It has also been suggested earlier that the above neutralization sludges be used in combination with silicic acid-containing compounds and that these be added thereto in the stoichiometric up to twice the stoichiometric proportion, based on the quantity necessary for the formation of alkali-alumino silicates of the general formula $Me_2Al_2\text{-}SiO_6$, in which Me stands for an alkali metal, and in further combination with an alkali liquor so as to establish a molar ratio of alkali metal oxide/$P_2O_5$ of between 4.0 and 5.0, and that the resulting suspension be heated over a period of between 30 and 200 minutes to temperatures higher than 90° C, preferably about 110° C. Following this proposal, the reaction mixture is treated with phosphoric acid so as to establish a molar ratio of alkali metal oxide/$P_2O_5$ of between 2.5 and 3.5 therein, and the $P_2O_5$-concentration in the solution is reduced down to 6 to 10 weight percent, preferably 7 to 9 weight percent, by the addition of water or recycled wash solutions. After filtration, the insoluble residue consisting of $Fe(OH)_3$ and $Me_2Al_2SiO_6$ is washed out and the filtrate used for the production of alkali metal phosphates.

This process is not satisfactory for the following reasons: The step of mixing the undilute reaction components together, which are comprised of sludge, sodium hydroxide solution and water glass, involves the formation of a medium that has been found strongly to handicap the growth of particulate solids, more particularly the growth of the alumino-silicate used as the filter aid. This and the high alkalinity effect the formation of alumino-silicates of poor adsorptive power upon the addition of the stoichiometric up to twice the stoichiometric proportion of water glass, which is needed for the formation of alumino-silicates of the general formula $Me_2Al_2SiO_6$. This is a fact which has adverse effects upon the filterability of the mash. Only by the addition of relatively large quantities of phosphoric acid and the successive dilution with water is it possible to transform the mash into material which does not forbid technical filtration. By this, the process is further handicapped as the $Na_2O/P_2O_5$-ratio is required to be regulated again by means of sodium hydroxide solution and this following filtration, so as to provide solubility relations which have beneficial effects upon the crystallization of sodium phosphate. At the same time, the process is rendered more costly as the quantity of salt obtained upon crystallization is increased by soluble $P_2O_5$, which is introduced together with the phosphoric acid, and the crystallization plant is required to be programmed for increased capacities. The use of the salt so made in the purification of wet-processed phosphoric acid effects further loss of $P_2O_5$, which is occasioned by the neutralization of a portion of unpurified phosphoric acid with that salt, and separation of the neutralization sludge so obtained.

The present invention now provides a process of purifying wet-processed phosphoric acids by neutralization with an alkali metal hydroxide and/or carbonate, which comprises a first step comprising combining the crude phosphoric acids and the alkali metal hydroxide and/or carbonate in a quantitative ratio such that the resulting mixture has a pH-value of between 4 and 9, and isolating the resulting so-called primary neutralization sludge consisting substantially of insoluble aluminum and iron phosphates from the purified alkali metal phosphate solution; a second step comprising mixng the said sludge with a mixture consisting of alkali liquor and a trialkali phosphate solution and with a mixture consisting of water glass and a trialkali phosphate solution so as to produce a mash containing $SiO_2$ and $Al_2O_3$ in a molar ratio of larger than 2:1, and dissolved alkali metal oxide and dissolved $P_2O_5$ in a molar ratio of between 2.9:1 and 3.3:1; a third step comprising heating the said second step mash to temperatures of between 80° and 100° C and thereby disintegrating sludge appearing in the said suspension with the resultant formation firstly of a solid residue consisting substantially of a mixture of Fe(OH)$_3$ and alkali-alumino silicate containing SiO$_2$ and Al$_2$O$_3$ in a molar ratio of larger than 2, and secondly of a solution, freeing the said solution from, and discarding, the said residue; and a fourth step comprising cooling the said third step solution containing between 0.1 and 1.0 weight percent of fluorine, and thereby effecting crystallization of a trialkali phosphate/alkali fluoride double salt of the formula Me$_3$PO$_4$ · xMeF · yH$_2$O, in which Me stands for an alkali metal, x is a number of between 0.1 and 0.5 (this conditional upon the fluorine concentration in the solution) and y is a number of between 9 and 19, isolating the said double salt from its mother liquor and successively using it for purifying a portion of the crude phosphoric acid with the resultant formation firstly of a so-called secondary neutralization sludge and secondly of a fraction of purified alkali metal phosphate solution, the said secondary neutralization sludge being discarded and the said fraction of purified solution being combined with alkali metal phosphate solution purified in the first step.

The trialkali metal phosphate solution used in the second process step is preferably mother liquor coming from the fourth process step.

The sludge in the second process step should preferably be mixed with such a quantity of water glass that the resulting mixture has a SiO$_2$/Al$_2$O$_3$-molar ratio of between 2:1 and 5:1.

It is also possible to effect the fourth step crystallization in a plurality of partial steps, preferably in two crystallizing steps, of which the first step should conveniently be effected at temperatures of between 70° and 37° C, and the second at temperatures of between 37° and 10° C.

In the second process step, the sludge should preferably be mixed with an about 50 weight percent alkali liquor diluted with a trialkali phosphate solution in a ratio by weight of 1:2, and with water glass diluted with a trialkali phosphate solution in a ratio by weight of 1:1.

The second step mash, which is produced on mixing the sludge with the mixture of alkali liquor and trialkali phosphate solution, should preferably be stirred for a period of between 5 and 20 minutes prior to adding the mixture of trialkali phosphate solution and water glass thereto and prior to heating the resulting mash for a period of between 30 and 300 minutes at temperatures of between 80° and 100° C.

The mash which is heated in the third process step may be diluted with mother liquor coming from the fourth step so as to establish a P$_2$O$_5$-content of between 7 and 10 weight percent therein and thereby improve the filterability of the solid residue which is successively isolated.

The process of the present invention offers a series of beneficial effects.

The transformation of the phosphate-containing neutralization sludge into an iron hydroxide/alkalialumino silicate sludge free from phosphate is effected under optimum conditions, with respect to the separation of such sludge from the trialkali phosphate solution.

The step of maintaining a certain fluorine concentration in the trialkali phosphate solution provides the conditions which are necessary for the production of a trialkali phosphate/ alkali fluoride hydrate.

This trialkali phosphate/alkali fluoride-hydrate is used for the neutralization of a portion of impure phosphoric acid and a secondary neutralization sludge is produced which substantially consists of fluorides and soluble phosphates.

The contaminants of wet-processed phosphoric acids being almost exclusively removed in the form of compounds containing little insoluble phosphate, it is possible by the process of the present invention to purify wet-processed phosphoric acids at the price of extremely low loss of P$_2$O$_5$, i.e. under commercially highly attractive conditions. In the production of wet-processed phosphoric acids for use in detergents and food, the present process further enables use to be made of phosphate ores which in fact have beneficial properties but have not been employed heretofore because of especially high concentrations of iron and aluminum herein and because of the inherent risk of loss of P$_2$O$_5$ during purification.

The process of the present invention is generally carried out as follows: Impure wet-processed phosphoric acid is neutralized in one or more steps with the use of an alkali hydroxide or carbonate so as to establish a pH-value of between 4 and 9. This results in the formation of a suspension firstly of insoluble phosphates and fluorides of the elements iron, aluminum, magnesium, calcium, etc., and secondly of soluble alkali phosphates. The insoluble constituents are isolated from the alkali phosphate solution by means of pressure filters and delivered to a container fitted with a rapid agitator. At a temperature of between 80° and 100° C, preferably 90° C, they are made therein into a mash using recycled mother liquor, which comes from the fourth process step and is diluted with alkali liquor in a ratio by weight of 1:2, the mother liquor being added at such a rate that an alkali metal oxide/P$_2$O$_5$-molar ratio of between 2.9 and 3.3:1 is established. The mash is stirred for about 15 minutes and a mixture of equal parts of recycled mother liquor and water glass is successively added thereto so as to establish a molar ratio of SiO$_2$/Al$_2$O$_3$ of at least 2:1, in the mash. The whole is allowed to stand for a period of time of between 30 and 300 minutes at temperatures of between 80° and 100° C and then diluted with recycled mother liquor, so as to produce a suspension containing between 7 and 10 weight percent of P$_2$O$_5$. The suspension so made contains an alkalialumino silicate/iron hydroxide sludge of very good filterability and easy to isolate using an appropriate filter from the trialkali phosphate solution, which is obtained simultaneously therewith. As the solutions readily tend to crystallize, it is beneficial to use pressure filters, such as a filter press, rotary pressure filter, candle filter, centrifugal filter or similar filter.

The good properties of this sludge are primarily occasioned by the formation of well-defined alkalialumino silicates and the step of intimately mixing them with the iron hydroxide obtained at the same time. It has more particularly been discovered that alkalialumino silicates of given composition are extremely well adapted for use as filter aids. A determining factor for this is the SiO$_2$/Al$_2$O$_3$-molar ratio in these compounds. Aluminosilicates with a higher SiO$_2$/Al$_2$O$_3$-molar ratio generally have a more distinct crystalline nature than compounds with a lower SiO$_2$/Al$_2$O$_3$-molar ratio. This is a fact which primarily determines the compounds' adsorption properties and hence their usefulness as filter aids. It has been discovered that the molar ratio of $SiO_2/Al_2O_3$ should not be smaller than 2. If a smaller ratio is selected, then the alkali-alumino-silicates have an adsorptive power too low for positively influencing the filtration of the iron hydroxide.

Critical factors with regard to the formation of aluminosilicates having good filter aid properties are also the concentration and pH-value of the solution, in which they are produced. The concentration influences the growth of the nuclei formed and the pH-value influences particularly the $SiO_2/Al_2O_3$-ratio of the precipitating alumino-silicates. This ratio has been found to regulate, and this via the equilibrium existing in the solution between complex, relatively stable phosphatoaluminate ions and unstable hydroxialuminate ions, the quantity of aluminum which is available for reaction to alumino-silicates.

$[Al(PO_4)_2]^{---} + 4 OH^- \leftrightarrows [Al(OH)_4]^- + 2 PO_4^{---}$

At high pH-values, large quantities are available. This means in other words that the formation of alumino-silicates with a low $SiO_2/Al_2O_3$-ratio tends to be favored, for a given excess of $SiO_2$. It has been found that in order fairly completely to utilize the quantity of $SiO_2$ added, it is necessary to use the alkali metal oxide and $P_2O_5$ in a molar ratio of between 2.9 and 3.3:1 and dilute the reaction components in the manner described hereinabove.

The step of diluting the mash with recycled mother liquor so as to establish a total $P_2O_5$-concentration of between 7 and 10 weight percent has been found to facilitate the growth of newly formed alumino-silicate particles. At the same time, it does not forbid finishing treatment of the purified alkali phosphate solution under commercially attractive conditions, following separation of solid matter.

The alkali phosphate solutions so made contain between 0.1 and 1.0 weight percent of fluorine. By cooling these solutions down to temperatures of between 10° and 20° C, they are freed from the bulk of alkali metal oxide, $P_2O_5$ and fluorine therein. This is done by crystallizing out the trialkali phosphate/alkali fluoride-hydrate referred to earlier herein. As the fluorine has been found to bind a fraction of the alkali metal oxide, it is beneficial, prior to effecting the crystallization, to have an alkali oxide/$P_2O_5$-ratio of more than 3 in the alkali phosphate solution so as to always have sufficient alkali metal oxide therein.

If use is made of an alkali phosphate solution which, prior to the crystallization, contains, for example, 8 weight percent of $P_2O_5$, 0.3 weight percent of F and alkali metal oxide and $P_2O_5$ in the molar ratio of 3.2:1, it is possible to recover approximately 85 weight percent of the $P_2O_5$ in the form of the trialkali phosphate/alkali fluoride-double salt by cooling the solution down to 10° C. The residue is mother liquor containing about 2 weight percent of $P_2O_5$, which is heated with starting solution having a temperature of 80° C and flowing countercurrently thereto, and recycled for diluting the mash. The trisodium phosphate may be crystallized in one or more steps as already mentioned earlier herein. If carried out in a plurality of steps, for example at temperatures within the range of between 70° and 37° C, and 37° and 10° C, a salt fraction with a relatively high content of fluorine is obtained by crystallization in the upper temperature range, and a salt fraction with a relatively low content of fluorine is obtained by crystallization in the lower temperature range.

The crystallization should preferably be effected in a vacuum crystallizer fitted with a separate cooling water cycle system. The vacuum may be produced therein with the use of a steam jet blower or water ring pump.

Immediately following separation from the mother liquor — this is preferably done by centrifugation following thickening of the salt magma — the fluroine-containing trialkali phosphate hydrate is used for neutralizing a fraction of impure phosphoric acid. The neutralizing step may be carried out in one or more steps at pH-values of between 4 and 9. In any case, a so-called secondary neutralization sludge is produced which contains a good deal of the fluoride contaminants present in the phosphoric acid. The $P_2O_5$-quantitative ratio of salt/acid (approximately 28 weight percent of $P_2O_5$) lies at 1:1, for example, if the neutralization is effected at a pH-value of 7. The total quantity of sludge approximately is one-twentieth of the original quantity of phosphate-containing sludge. When dry, the sludge contains between 20 and 30 weight percent of fluorine and approximately the same quantity of $P_2O_5$, of which the bulk is soluble and adheres thereto. The pure trialkali phosphate solution obtained after removal of the sludge contains approximately 20 weight percent of $P_2O_5$ and it may immediately be combined with the bulk of the purified phosphate solution.

The loss of $P_2O_5$, which is occasioned by the removal of contaminants in the form of alkalialuminosilicate sludge and secondary neutralization sludge, generally is by 10 percent lower than that occasioned by conventional purification processes, wherein the phosphate-containing sludge is discarded. The absolute loss of $P_2O_5$ depends on the phosphate raw material used in each particular case.

EXAMPLE 27 kg of crude phosphoric acid, which was produced by subjecting Kola phosphate to treatment with sulfuric acid and contained 28.3 weight percent of $P_2O_5$, 0.193 weight percent of fluorine and 0.36 weight percent of $Al_2O_3$, was neutralized with the use of 16.5 kg of sodium hydroxide solution with a strength of 50 weight percent. The resulting suspension was filtered at about 80° C with the aid of a rotary filter. The sodium phosphate solution freed from undissolved solids contained 17.45 weight percent of $P_2O_5$ and 0.0394 weight percent of fluorine. The Na/P-ratio was at about 2:1. 4.5 kg of neutralization sludge were produced at the same time. It contained 10.77 weight percent of $P_2O_5$ and 70.5 weight percent of fluorine, based on the quantities used. The neutralization sludge was taken from the filter and delivered to a container which was fitted with a rapid agitator and charged earlier with 1.026 kg of sodium hydroxide solution with a strength of 50 weight percent, and double the quantity of recycled mother liquor having a strength of 2 weight percent, preheated to a temperature of 80° C. After approximately 15 minutes, the mash was combined with a mixture of 0.424 kg of water glass (27 weight percent of $SiO_2$, 8 weight percent of $Na_2O$) and 0.424 kg of recycled mother liquor, and the resulting mash was stirred for approximately 30 minutes at temperatures of between 80° and 100° C. Following this, a further 4.4 kg of mother liquor were added to dilute the mash, which was successively filtered by means of a filter press. 9.82 kg of a trisodium phosphate solution containing 8.08 weight percent of $P_2O_5$, 0.319 weight percent of fluorine and 1.98 kg of an aluminosilicate/iron hydroxide-sludge containing 54.5 weight percent of $H_2O$ were obtained. Based on the dry substance, the sludge contained 16.0 weight percent of $P_2O_5$, 1.0 weight percent of fluorine, 12.7 weight percent of $SiO_2$ and 10.8 weight percent of $Al_2O_3$. The trisodium phosphate solution was cooled down to 10° C in a vacuum crystallizer and 3.97 kg of salt were found to crystallize out. The salt was separated from its mother liquor by means of a centrifuge. Following separation, the salt contained approximately 6 percent of adhering water, 17.04 weight percent of $P_2O_5$ and 0.698 weight percent of fluorine. The residue was mother liquor (5.852 kg). It contained 2 weight percent of $P_2O_5$ and 0.06 weight percent of fluorine. The mother liquor was preheated to 40° C using hot trisodium phosphate solution, which had a temperature of 80° C and flowed countercurrently with respect thereto, and the whole was successively delivered to the vacuum crystallizer for dilution therein of the sodium hydroxide solution and water glass, which were used for effecting transformation of the phosphate-containing neutralization sludge into an aluminosilicate/iron hydroxide-sludge.

The isolated moist salt (3.97 kg) was dissolved in 34 kg of crude phosphoric acid containing 28.2 weight percent of $P_2O_5$ and the resulting suspension was filtered by means of a filter press. 6.115 kg of a sodium phosphate solution, which contained 22 weight percent of $P_2O_5$ and 0.0374 weight percent of fluorine, were obtained together with 0.255 kg of a neutralization sludge containing 42 weight percent of water. Based on the dry substance, the sludge contained 22.3 weight percent of $P_2O_5$ and 20.35 weight percent of fluorine.

The two purified sodium phosphate solutions were combined and 45.115 kg of a solution containing 18.05 weight percent of $P_2O_5$ and 0.0391 weight percent of fluorine were obtained, $P_2O_5$ was obtained in a total yield of 97.68 weight percent, based on the $P_2O_5$ quantity used in the form of impure acid. 1.9 weight percent of $P_2O_5$ were discarded together with the iron hydroxide/aluminosilicate-sludge, and a further 0.42 weight percent was discarded together with the secondary neutralization sludge.

I claim:

1. A process of purifying phosphoric acid, based on phosphate ores wet-processed with mineral acids, by neutralizing the phosphoric acid, with an alkali metal hydroxide and/or carbonate, which comprises dividing the phosphoric acid to be purified in two portions, treating the first portion in a first step by combining the said first acid portion, with at least one member selected from the group consisting of metal hydroxides and carbonates in a quantitative ratio such that the resulting mixture has a pH-value of between 4 and 9, and isolating the resulting primary neutralization sludge consisting substantially of insoluble aluminum and iron phosphates from the purified alkali metal phosphate solution, mixing in a second step the said sludge with a mixture consisting of alkali liquor and a trialkali phosphate solution and with a mixture consisting of water glass and a trialkali phosphate solution so as to produce a mash containing $SiO_2$ and $Al_2O_3$ in a molar ratio between 2:1 and 5:1, and dissolved alkali metal oxide and dissolved $P_2O_5$ in a molar ratio of between 2.9:1 amd 3.3:1; heating in a third step the said second step mash to temperatures of between 80° and 100° C and thereby disintegrating sludge appearing in the said mash with the resultant formation of a solid residue and a solution, freeing the said solution from, and discarding the said residue; cooling in a fourth step the said third step solution adjusted to between 0.1 and 1.0 weight percent of fluorine, and thereby effecting crystallization of a trialkaliphosphate/alkali fluoride double salt, separating the said double salt from its mother liquor and successively using the said double salt for neutralizing and purifying the other portion of the crude phosphoric acid with the resultant formation of a secondary neutralization sludge and an alkali metal phosphate solution, the said secondary neutralization sludge being discarded and the said fourth step alkali phosphate solution being combined with alkali phosphate solution purified in the first step.

2. The process as claimed in claim 1, wherein mother liquor coming from the fourth process step is the trialkali phosphate solution used in the second process step.

3. The process as claimed in claim 1, wherein the crystallization in the fourth process step is effected in two stages.

4. The process as claimed in claim 3, wherein the crystallization is effected in two stages, the crystallization in the first stage being effected at temperatures of between 37° and 70° C, and the crystallization in the second stage being effected at temperatures of between 10° and 37° C.

5. The process as claimed in claim 1, wherein the sludge is mixed in the second process step with alkali liquor diluted with trialkali phosphate solution in a ratio by weight of about 1:2.

6. The process as claimed in claim 1, wherein the sludge is mixed in the second process step with water glass diluted with trialkali phosphate solution in a ratio by weight of about 1:1.

7. The process as claimed in claim 1, wherein the mash produced by mixing the sludge with the alkali liquor or with the mixture of alkali liquor and trialkali phosphate solution is stirred in the second process step for a period of between 5 and 20 minutes, and the mixture of trialkali phosphate solution and water glass is successively added to the mash so stirred.

8. The process as claimed in claim 1, wherein the mixture produced in the second process step is heated to temperatures of between 80° and 100° C over a period of between 30 and 300 minutes.

9. The process as claimed in claim 1, wherein the heated mixture is diluted in the third process step with mother liquor coming from the fourth process step so as to establish a $P_2O_5$ concentration of between 7 and 10 weight percent.

* * * * *